US006521160B2

(12) United States Patent
Suzuki

(10) Patent No.: US 6,521,160 B2
(45) Date of Patent: Feb. 18, 2003

(54) MULTIPOLAR WATERPROOF CONNECTOR

(75) Inventor: Shogo Suzuki, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/802,947

(22) Filed: Mar. 12, 2001

(65) Prior Publication Data

US 2001/0009823 A1 Jul. 26, 2001

Related U.S. Application Data

(62) Division of application No. 09/644,708, filed on Aug. 24, 2000, now Pat. No. 6,244,898.

(30) Foreign Application Priority Data

Aug. 26, 1999 (JP) .......................................... 11-240187

(51) Int. Cl.[7] ........................ B29C 45/14; B29C 70/74; B29C 70/80

(52) U.S. Cl. ........................ 264/267; 264/273; 264/275

(58) Field of Search ................................ 264/267, 273, 264/275, 255, 276; 439/587, 589, 281; 29/858

(56) References Cited

U.S. PATENT DOCUMENTS 4,842,540 A * 6/1989 Endo et al. ................ 439/271
4,961,713 A * 10/1990 McCracken et al. ........ 439/587
5,293,002 A * 3/1994 Grenet et al. .............. 174/52.2
5,334,039 A * 8/1994 Kanda ........................ 264/267
5,711,685 A * 1/1998 Wood ......................... 439/587
5,830,011 A * 11/1998 Wood ......................... 439/587
5,851,472 A * 12/1998 Kashiyama ................. 264/268
5,861,120 A * 1/1999 Yagi et al. .................. 264/255
5,927,725 A * 7/1999 Tabata et al. ............... 439/587
6,033,261 A * 3/2000 Wakata et al. .............. 439/587
6,039,603 A * 3/2000 Wakata et al. .............. 439/587
6,179,657 B1 1/2001 Suzuki
6,196,873 B1 * 3/2001 Murakami et al. .......... 439/595
6,203,348 B1 * 3/2001 Fukuda ....................... 439/275
6,257,928 B1 * 7/2001 Murakami et al. .......... 439/587
6,290,521 B1 * 9/2001 Suzuki et al. ............... 439/189

FOREIGN PATENT DOCUMENTS

JP 2803849 7/1998
WO WO 89/04072 5/1989

* cited by examiner

*Primary Examiner*—Angela Ortiz
(74) *Attorney, Agent, or Firm*—Finnegan, Henderson, Farabow, Garrett, & Dunner LLP

(57) ABSTRACT

A waterproof connector 1 includes: a plurality of terminal accommodating chambers 4, 6A arranged in the vertical and the traverse direction of a connector housing 2; and a plurality of rubber plug accommodating chambers 6B communicated with the terminal accommodating chambers 6A, wherein a rubber plug 8 in which an electrical wire insertion hole 8*a* is formed is arranged in each rubber plug accommodating chamber 6B, a terminal 9 connected with an electrical wire W is capable of being freely accommodated in each terminal accommodating chamber 4, 6A, a plug material injection port 7A, plug material path 7B and vent hole 7C are serially formed in each row of the rubber plug accommodating chambers 6B in one of the vertical and the traverse direction of the peripheral wall 5*d* and the partition wall 5*e* which form the rubber plug accommodating chambers 6B of the connector housing, plug material is injected into the rubber plug accommodating chambers 6B of each row from the plug material injection port 7A of each row so as to integrally form rubber plugs 8 in which electrical wire insertion holes 8*a* having a plurality of sealing portions 8*b* closely coming into contact with the outer circumferences of the electrical wires W are formed.

2 Claims, 11 Drawing Sheets

MULTIPOLAR WATERPROOF CONNECTOR

This is a division of application Ser. No. 09/644,708, filed Aug. 24, 2000, now U.S. Pat. No. 6,249,898, which is incorporated herein by reference.

BACKGROUND OF THE INVENTION

1. Technical Field

The present invention relates to a small multipolar waterproof connector in which the waterproof property is enhanced between a connector housing and a plurality of electrical wires connected with terminals.

2. Related Art

FIG. 9 shows one type of waterproof connector. A connector housing 102 of this waterproof connector 101 has formed therein a plurality of terminal accommodating chambers 103 each of which forms at its rear portion an electric wire sealing chamber 104 so that the sealing chamber 104 is communicated therewith. Also, each terminal accommodating chamber 3 accommodates a female terminal 106 having an electric wire connected thereto with the female terminal 106 being engaged with a lance (flexible engaging arm) 107. Further, each terminal accommodating chamber 103 and its corresponding electric wire 105 are sealed by a rubber plug 108 forced into the electric wire sealing chamber 104.

It is to be noted that similar techniques regarding the waterproof connector 101 are disclosed in Japanese Patent Examined Publication No. Hei. 5-65996 and Japanese Patent Unexamined Publication No. Hei. 1-213973.

However, in the above-described waterproof connector 101, as shown in FIG. 10, the diameter L of the electric wire sealing chamber 104 must be made larger than the diameter of the terminal accommodating chamber 103 for the purpose of mold releasing or terminal insertion. Therefore, the terminal-to-terminal pitch X is limited with the result that the connector housing 102 has become large in size. Also, since the rubber plug 108 is exposed from a rear surface side of the connector housing 102 to the outside, the rubber plug 108 is damaged or deformed during high-tension cleaning or due to contact therewith of a machine tool or the like, with the result that a desired level of sealing performance was not obtained.

SUMMARY OF THE INVENTION

The present invention has been achieved with such points in mind.

It therefore is an object of the present invention to provide a multi-polar waterproof connector which enables the miniaturization of the connector housing as well as the enhancement of the sealability and assemblability thereof and a method of assembling the same.

To achieve the object, according to a first aspect of the present invention, there is provided a waterproof connector including: an inner housing having formed therein terminal accommodating chamber in which terminals to which electric wires are to be connected are accommodated; rubber plugs for sealing the electric wires, the rubber plugs having formed therein holes through which the electric wires are inserted and passed; and an outer housing into which the inner housing is fitted, an one wall portion of the outer housing opposing to the terminal accommodating chambers being formed with electric wire insertion and passing holes into which the electric wires are inserted and passed, an inside portion of the one wall portion of the outer housing corresponding to the electric wire insertion and passing holes being formed with rubber plug accommodating recessed portions for accommodating therein the rubber plugs, wherein the electric wires that have been inserted and passed through the electric wire insertion and passing holes and the holes of the rubber plugs are connected to the terminals which are accommodated in the terminal accommodating chambers.

In this waterproof connector, since the diameter of the rubber plug accommodating recessed portions of the outer housing can be minimized irrespective of the size of the terminal accommodating chambers of the inner housing, the terminal-to-terminal's pitch becomes small with the result that it is possible to miniaturize a multipolar connector housing (which is composed of the inner housing and the outer housing). Also, since the rubber plugs are not exposed to the outside from the one wall portion of the outer housing, the degradation of the sealing performance of the rubber plugs due to an external force does not occur, with the result that the reliability on the waterproofness effected with the rubber plugs is enhanced.

According to a second aspect of the present invention, as it depends from the first aspect, there is provided a waterproof connector wherein, a tapered surface is formed on an inlet side of the rubber plug accommodating recessed portion; a tapered surface is formed on each side of the rubber plug; and a rubber plug guiding portion to guide the rubber plug is formed at a position of the inner housing corresponding to the tapered surface of the rubber plug.

In this waterproof connector, the rubber plug guiding portion off the inner housing, the tapered surface on an inlet side of the rubber plug accommodating recessed portion of the outer housing, the tapered surface of the rubber plug, and the electric wire serve and operate as guides, whereby the rubber plug is accommodated reliably in a simple way in the rubber plug accommodating recessed portion of the outer housing. As a result, the reliability on the waterproofness effected with the rubber plugs is further enhanced.

According to a third aspect of the present invention, there is provided a method of assembling a waterproof connector including the steps of: inserting and setting rubber plugs for sealing the electric wires in rubber plug accommodating recessed portions formed in an inside portion of a one wall portion of an outer housing; inserting and passing the electric wires into and through electric wire insertion and passing holes formed in the outer housing at the positions of the one wall portion opposed to the terminal accommodating chambers; inserting and passing the electric wires which are passing through the electric wire insertion and passing holes into and through holes which are formed in the rubber plugs; connecting the electric wires passed through the holes of the rubber plugs to the terminals accommodated in the terminal accommodating chambers; and fitting the inner housing into the outer housing.

In this method of assembling a waterproof connector, a small-in-size and multipolar waterproof connector having excellent waterproofness is assembled smoothly in a simple way and in a short time.

The invention provides a waterproof connector including: a plurality of terminal accommodating chambers arranged in the vertical and the traverse direction of a connector housing; and a plurality of rubber plug accommodating chambers communicated with the terminal accommodating chambers, wherein a rubber plug in which an electrical wire insertion hole is formed is arranged in each rubber plug accommodating chamber, a terminal connected with an electrical wire is capable of being freely accommodated in each terminal accommodating chamber, each terminal accommodating chamber and an electrical wire are sealed by the rubber plug, a plug material injection port, plug material path and vent hole are serially formed in each row of the rubber plug accommodating chambers in one of the vertical and the traverse direction of the peripheral wall and the partition wall which form the rubber plug accommodating chambers of the connector housing, plug material is injected into the rubber plug accommodating chambers of each row from the plug material injection port of each row so as to integrally form rubber plugs in which electrical wire insertion holes having a plurality of sealing portions closely coming into contact with the outer circumferences of the electrical wires are formed.

In this waterproof connector, plug material is injected into each rubber plug accommodating chamber of each row from the plug material injection port of each row, so that the rubber plug can be integrally formed in which an electrical wire insertion port having a plurality. of sealing portions tightly coming into contact with the outer circumference of the electrical wire is integrally formed. Therefore, no workers forget to attach the rubber plugs, and sealing can be positively made between each rubber plug accommodating chamber of the connector housing and the rubber plug and also between the rubber plug and the electrical wire. Therefore, the waterproof performance and the waterproof reliability can be enhanced. Due to the foregoing, it becomes unnecessary to provide a process in which the rubber plug is attached to the connector housing when the waterproof connector is assembled. Therefore, the multipolar waterproof connector, the sealing property of which is high, can be assembled in a short period of time, and the entire assembling property can be more enhanced.

The invention provides a waterproof connector wherein the positions of the plurality of sealing portions arranged in the electrical wire insertion holes of the rubber plugs integrally formed in the rubber plug accommodating chambers in each row are arranged so that they can not be the same as the positions of the plug material injection ports, plug material paths and vent holes in each row.

In this waterproof connector, the positions of a plurality of sealing portions in the electrical wire insertion holes of the rubber plugs integrally formed in the rubber plug accommodating chambers in each row are made different from the positions of the plug material injection ports of each row. Therefore, it is possible to prevent the deterioration of the waterproof performance with respect to a plurality of sealing portions in the electrical wire insertion holes of the rubber plug. Accordingly, the waterproof performance and the waterproof reliability of the waterproof connector can be more enhanced.

The present invention provides a waterproof connector:

a connector housing;

a terminal accommodating chamber provided in the connector housing; and a rubber plug accommodating chamber provided in the connector housing and adapted to pass a wire therethrough, one open end of the rubber plug accommodating chamber being connected to the terminal accommodating chamber, the other open end of the rubber plug accommodating chamber being communicated with an exterior of the connector housing so that the rubber plug accommodating chamber communicates an interior of the connector housing with the exterior via the terminal accommodating chamber, the rubber plug accommodating chamber including, two ports provided at a portion between the one open end and the other open end to communicate an interior of the rubber plug accommodating chamber with an exterior of the rubber plug accommodating chamber and located opposite from each other with respect to the rubber plug accommodating chamber, and a rubber plug accommodated in the rubber plug accommodating chamber and the ports, and adapted to seal the terminal accommodating chamber and the wire passed through the rubber plug accommodating chamber.

The present invention provides a method of providing waterproof characteristic to a waterproof connector made of resin material, the connector including: a connector housing; a terminal accommodating chamber provided in the connector housing; and a rubber plug accommodating chamber provided in the connector housing and communicated with the terminal accommodating chamber, the method including the steps of:

providing a port communicated with an interior of the rubber plug accommodating chamber setting a rubber forming mold in the rubber plug accommodating chamber;

injecting molten rubber material from the port to a space defined by the rubber plug accommodating chamber and the rubber forming mold to mold a rubber plug in the rubber plug accommodating chamber; and removing the rubber forming mold from the rubber plug accommodating chamber.

BRIEF DESCRIPTION OF THE DRAWINGS

FIG. 1(*b*) is a cross-sectional view showing a state after the waterproof connector of an embodiment of the present invention has been assembled.

FIG. 5(*b*) is a partially cross-sectional view of a comparative example of the primary portion.

FIG. 8(*b*) is a cross-sectional view showing a state in which a spacer is engaged with an outer housing of the waterproof connector.

FIG. 8(*c*) is a cross-sectional view showing a state in which an electrical wire is penetrated through the outer housing and spacer.

FIG. 8(*d*) is a cross-sectional view showing a state in which the electrical wire is connected with a terminal accommodated in a terminal accommodating chamber of an inner housing.

FIG. 8(*e*) is a cross-sectional view showing a state in which the waterproof connector has been assembled.

DETAILED DESCRIPTION OF PREFERRED EMBODIMENT

Figure 1A:
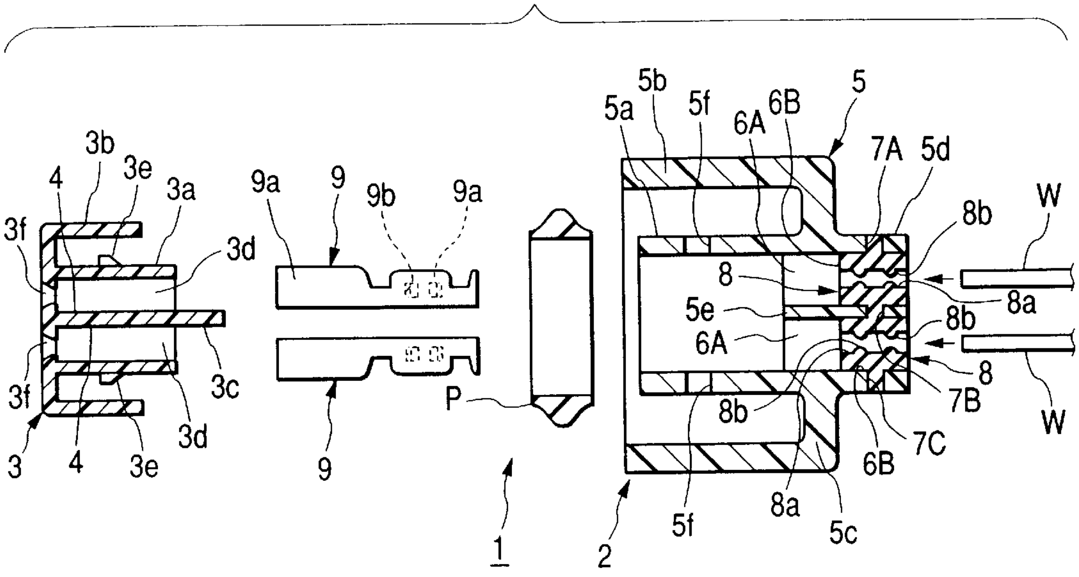
FIG. 1(*a*) is a cross-sectional view showing a state before the waterproof connector of an embodiment of the present invention is assembled.

Referring to the drawings, an embodiment of the present invention will be explained below.

First Embodiment

Figure 6:
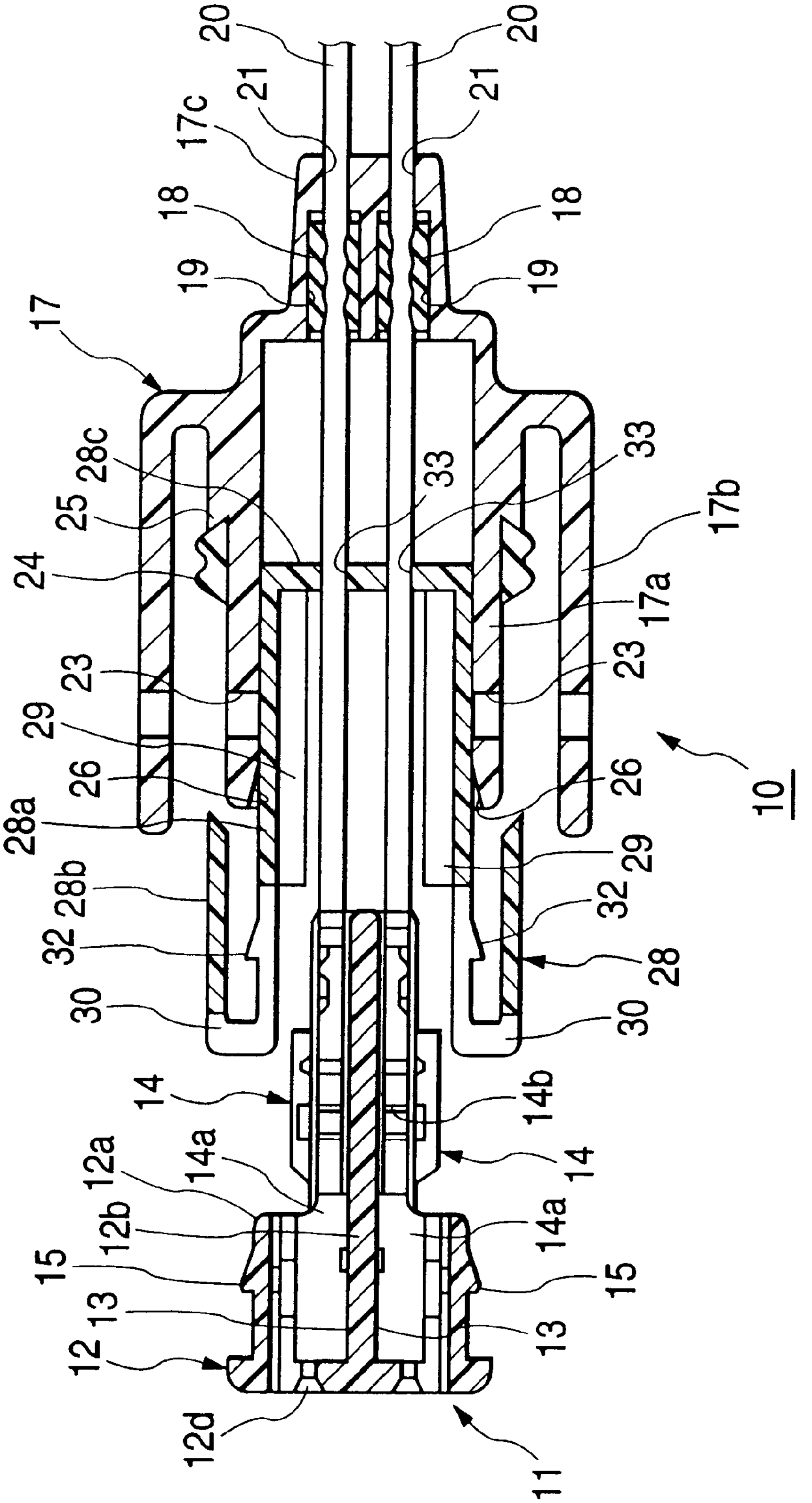
FIG. 6 is a cross-sectional view showing a state before a waterproof connector of the present invention is assembled.
Figure 7:
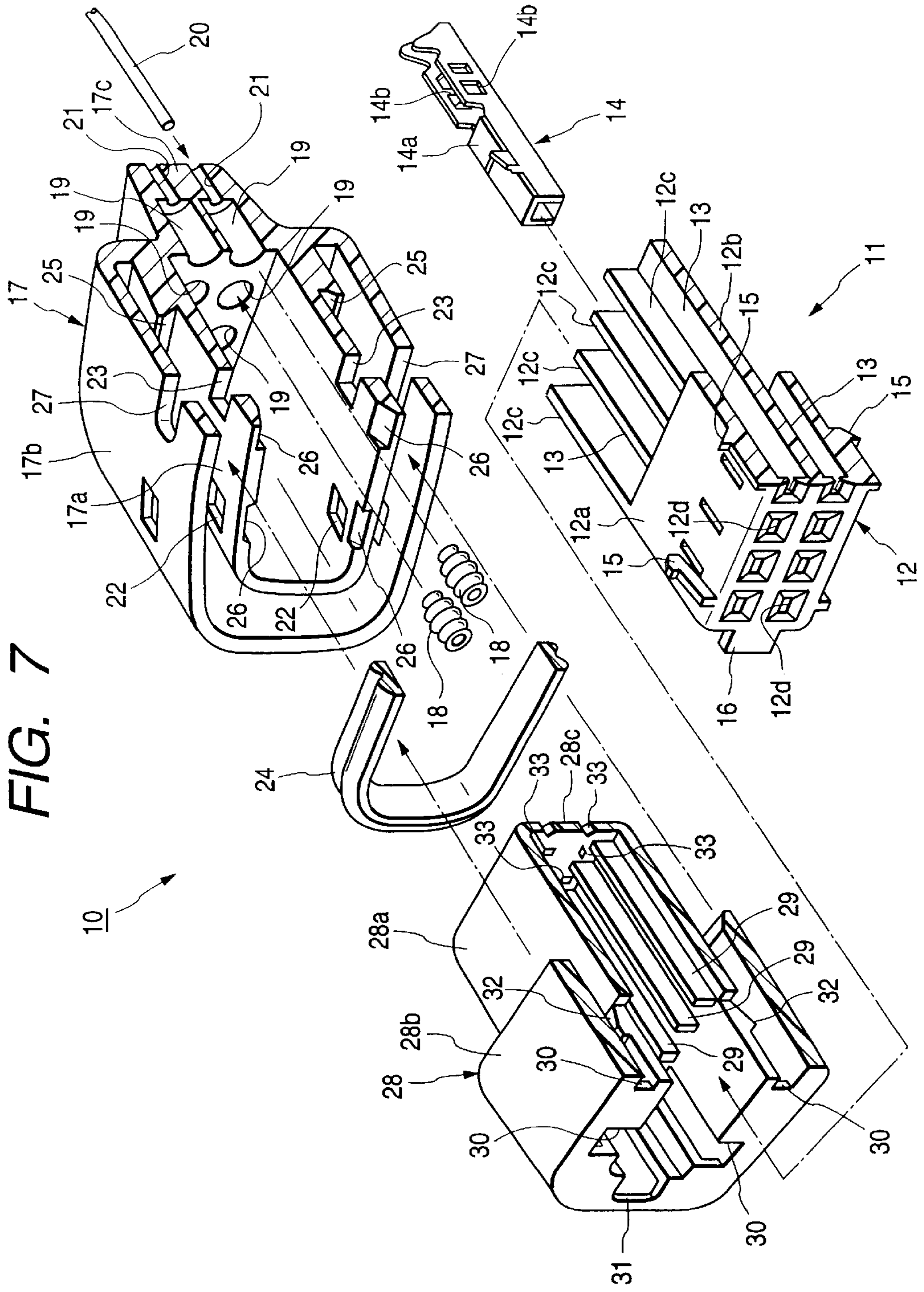
FIG. 7 is a partially cross-sectional perspective. view showing a state before the waterproof connector of the present invention is assembled.
Figure 8A:
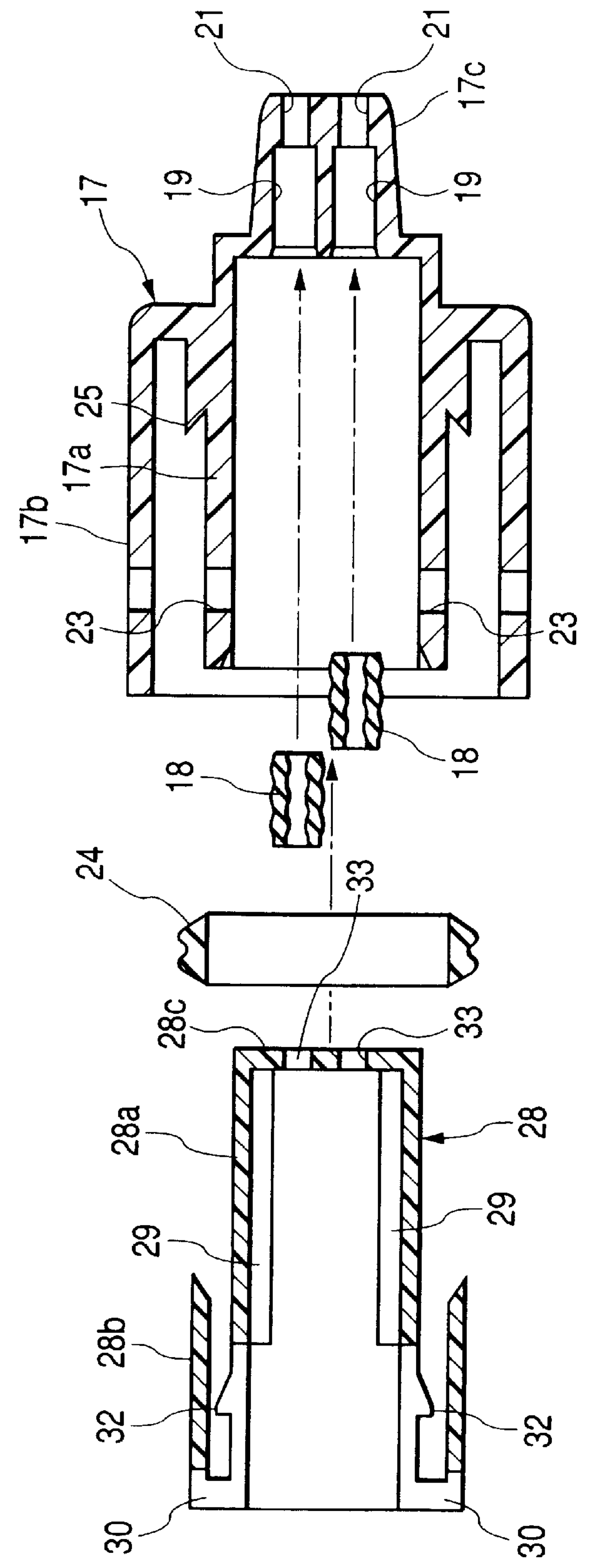
FIG. 8(*a*) is a cross-sectional view showing a state before the waterproof connector of the present invention is assembled.
Figure 8B:
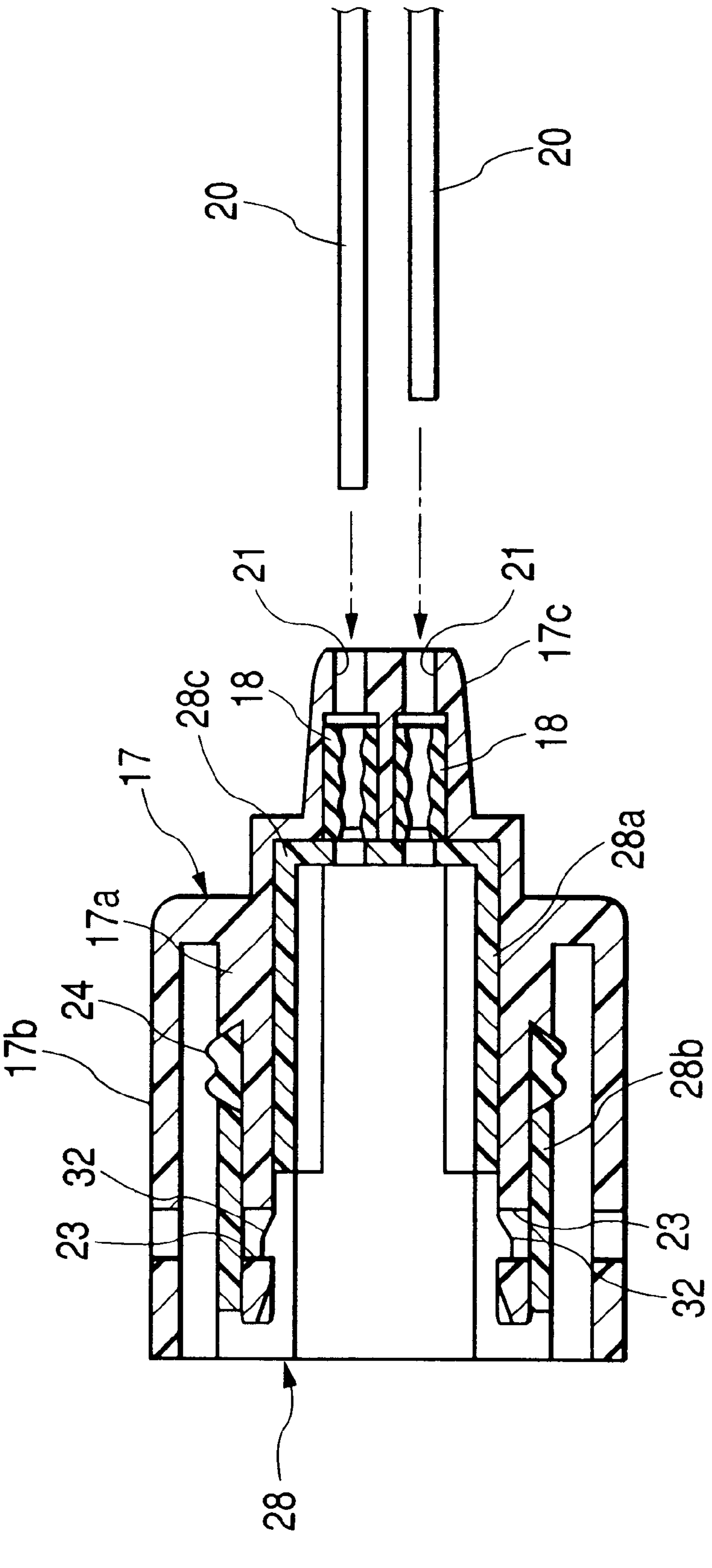
Figure 8C:
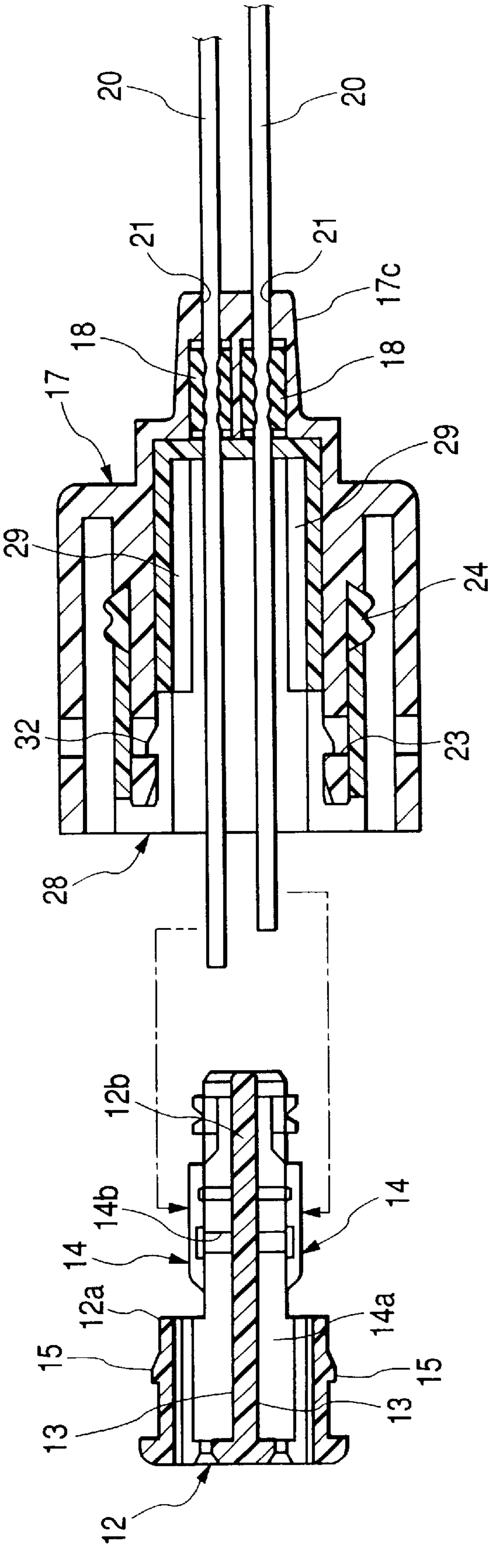
Figure 8D:
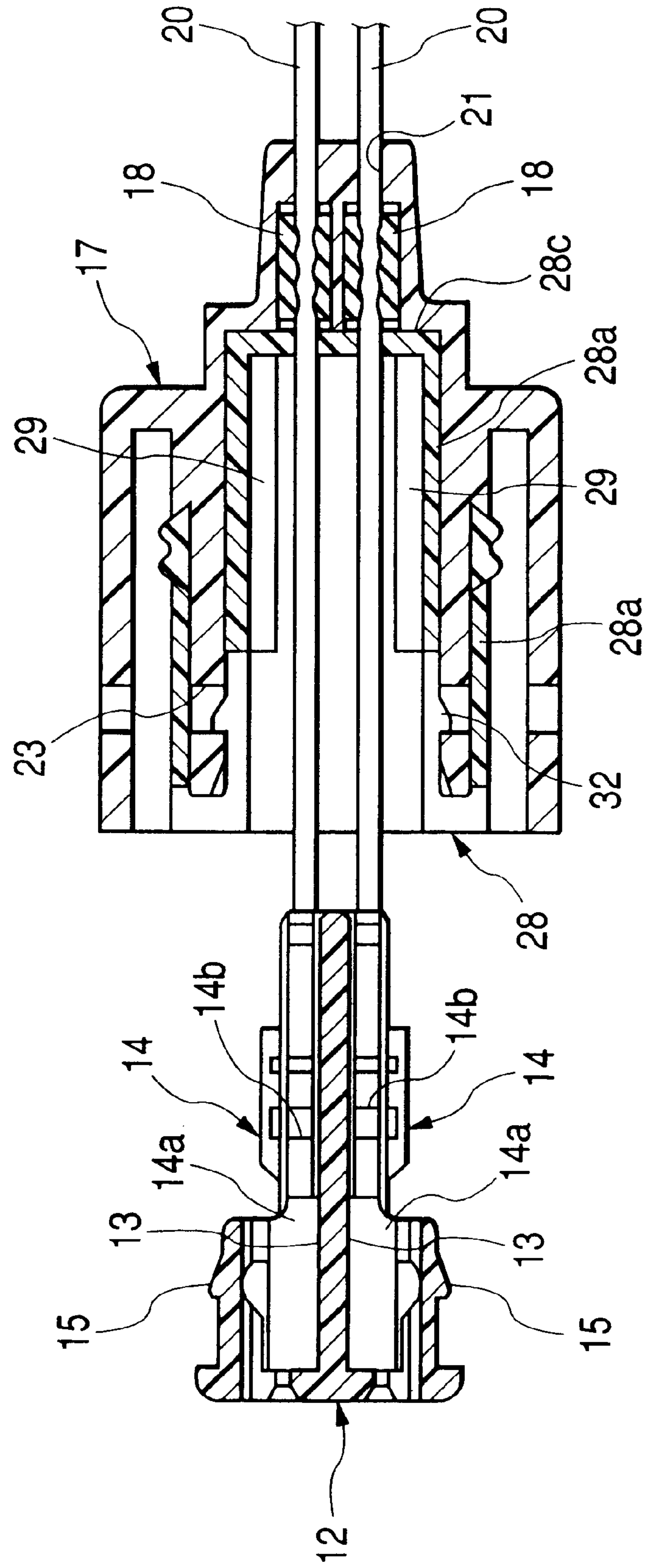
Figure 8E:
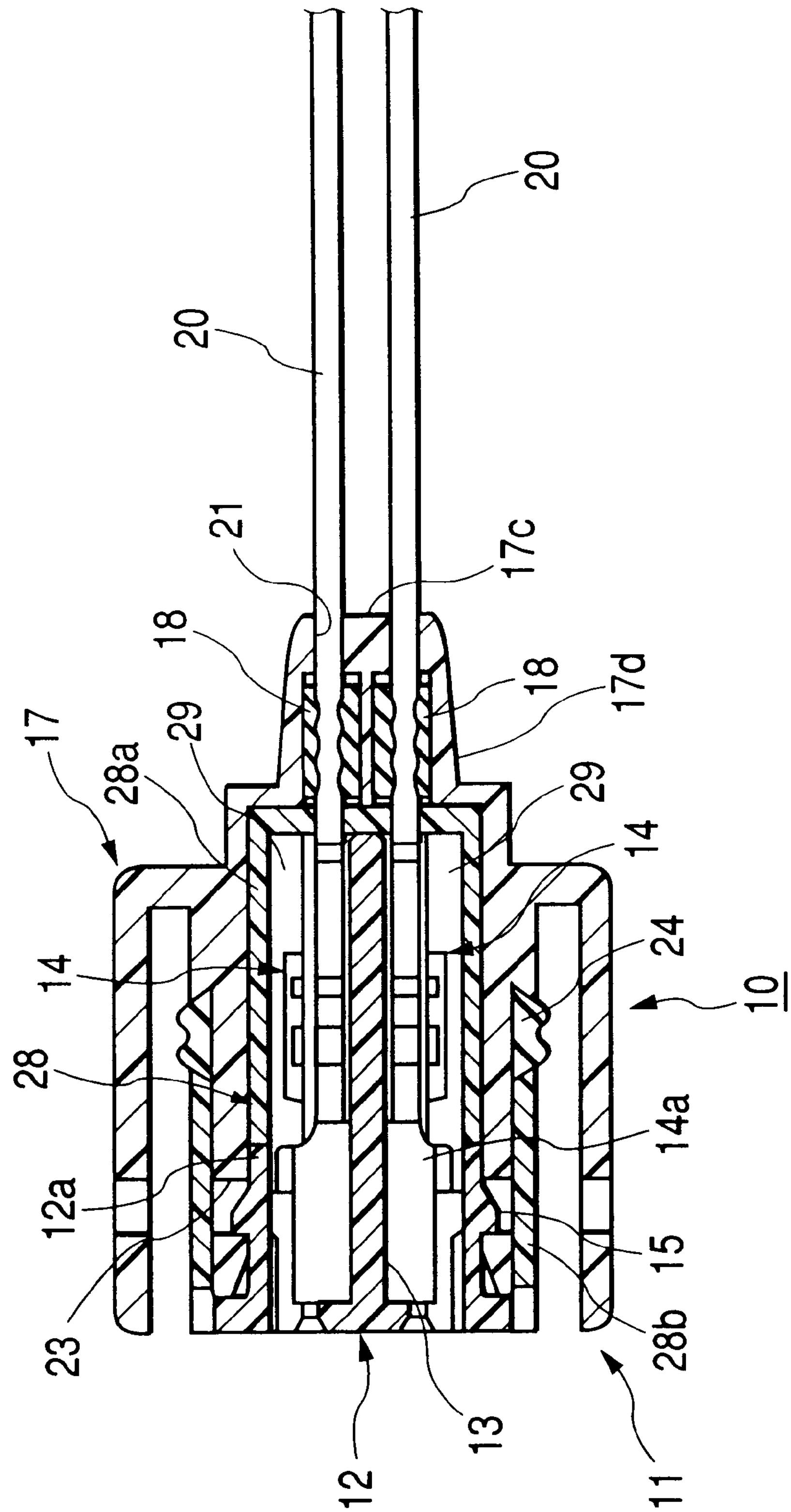
Figure 9:
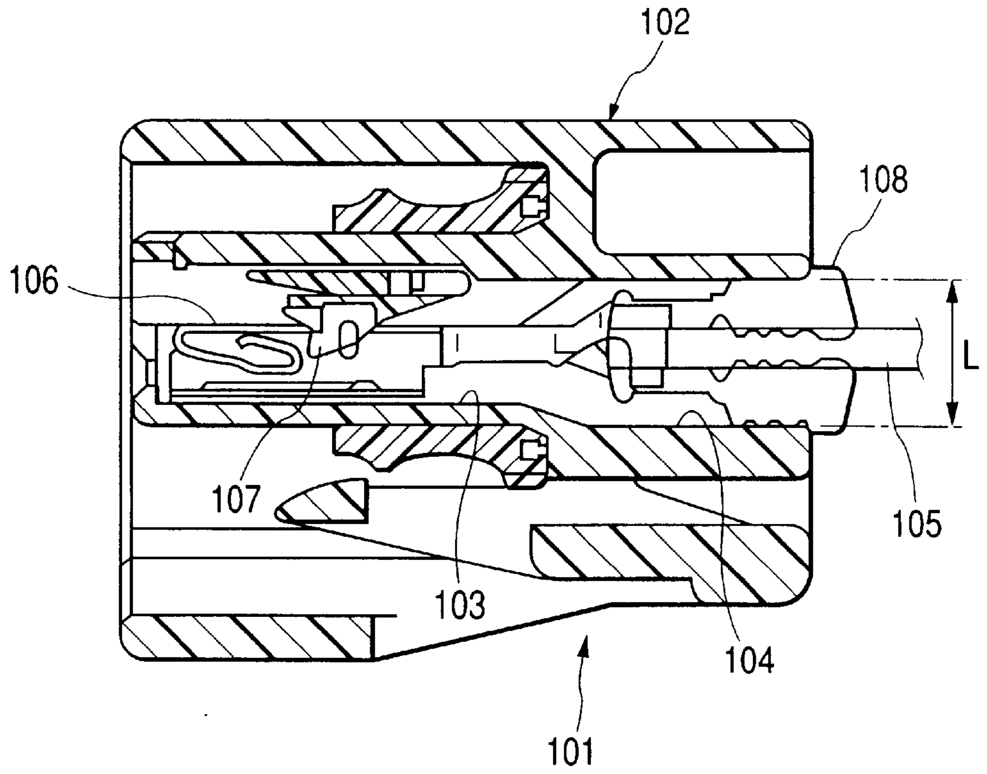
FIG. 9 is a sectional view showing a conventional example of a waterproof connector.
Figure 10:
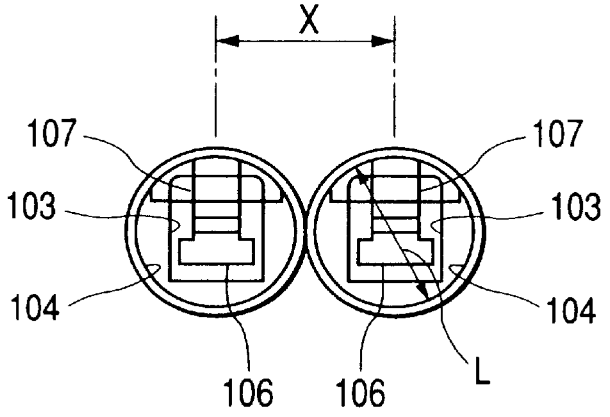
FIG. 10 is an explanatory view showing the pitch between terminals of the conventional waterproof connector.

FIG. 6 is a cross-sectional view showing a state before a waterproof connector of an first embodiment of the present invention is assembled. FIG. 7 is a partially cross-sectional perspective view showing a state before the waterproof connector is assembled. FIG. 8(*a*) is a cross-sectional view showing a state before the waterproof connector is assembled. FIG. 8(*b*) is a cross-sectional view showing a state in which a spacer is engaged with an outer housing of the waterproof connector. FIG. 8(*c*) is a cross-sectional view showing a state in which an electrical wire is penetrated through the outer housing and spacer. FIG. 8(*d*) is a cross-sectional view showing a state in which the electrical wire is connected with a terminal accommodated in a terminal accommodating chamber of an inner housing. FIG. 8(*e*) is a cross-sectional view showing a state in which the waterproof connector has been assembled.

As shown in FIGS. 6 to 8, the connector housing 11 of the waterproof connector 10 includes: an inner housing 12 made of synthetic resin in which a plurality of terminal accommodating chambers 13 are integrally formed; an outer housing 17 made of synthetic resin into which this inner. housing 12 is inserted; and a spacer 28 made of synthetic resin, which is interposed between the inner housing 12 and the outer housing 17, for holding the female terminals 14 accommodated in the terminal accommodating chambers 13 of the inner housing 12.

As shown in FIGS. 6 and 7, the inner housing 12 has a box section 12*a,* the upper and the lower face on the rear side thereof are respectively open. In the inner housing 12, the terminal accommodating chambers 13 are formed in a space which is formed by the horizontal wall 12*b* at the center and the vertical side walls 12*c* which are also used as partition walls. A female terminals 14 are accommodated in these terminal accommodating chambers 13, respectively. The engaging claws 15 are integrally protruded from both sides and the center of the upper and the lower face of the box section 12*a*. Further, the flange sections 16 are integrally protruded from the front end on both sides at the center. A rectangular insertion hole 12*d* is formed at. a position opposed to each terminal accommodating chamber 13 on the front wall of the box 12*a*. A male terminal of the opponent connector not shown is inserted into the rectangular insertion hole 12*d*. Further, a pair of pressure-contact blades 14*b,* 14*b* are formed by bend on both side plates at the rear of the box section 14*a* of the female terminal 14.

As shown in FIGS. 6 and 7, the outer housing 17 includes: an inner wall section 17*a* shaped a substantially square cylinder; an outer wall section 17*b* shaped substantially a square cylinder and enclosing the inner wall section 17*a;* and a bottom wall section 17*c* for connecting the rear sections of the inner wall section 17*a* and the outer wall section 17*b,* wherein the outer housing 17 is formed into a double-box-shape, the front side of which is open. The center of this bottom wall section 17*c* forms a thick section. Rubber plug accommodating recess sections 19 are formed at the positions on the front side in the thick section of the bottom wall section 17*c* and opposed to the terminal accommodating chambers 13. The diameters of the rubber plug accommodating recess sections 19 are large and the cross section of which are circular. The waterproof rubber plugs 18 are accommodated into the rubber plug accommodating recess section 19 by means of press-fitting. Electrical wire insertion holes 21 are formed on the rear side of the thick section, the diameters of which are small and the cross-sections of which are circular. The electrical wires are inserted into the electrical wire insertion holes 21. The electrical wire insertion holes 21 are adapted to be communicated with corresponding rubber plug accommodating recess section 19. Each waterproof rubber plug 18 is formed into a substantially cylindrical shape, the inner and the outer circumferential face of which are respectively protruded and recessed, so that the electrical wire 20 can penetrate the waterproof rubber plug 18 without leaving any gaps.

Engaging holes 22 are provided respectively on both sides of the front portions of the upper and the lower wall of the inner wall section 17*a* of the outer housing 17. The engaging claws 15 on both sides of the upper and the lower face of the box section 12*a* of the inner housing 12 are engaged with the engaging hole 22, respectively.

Rectangular long engaging holes 23 are -provided respectively at the centers on the front side of the upper and the lower wall of the inner wall section 17*a*. The engaging claws 15 at the centers of the upper and the lower face of the box section 12*a* of the inner housing 12 are engaged with the rectangular long engaging holes 23, respectively. A V-shaped packing receiving section 25 for receiving the annular waterproof packing 24 made of rubber is provided at the inner portion on the outer face side of the inner wall section 17*a* of the outer housing 17. There is respectively formed a tapered-face 26 at a position opposing to each engaging hole 22, 23 at the front edge on the inner face side of the inner wall section 17*a* of the outer housing 17. An engaging hole 27 is formed respectively on the front side of the upper and the lower wall of the outer wall section 17*b* of the outer housing 17. A flexible engaging arm of the connector on the opponent side not shown is engaged with the engaging hole 27.

As shown in FIGS. 6 and 7, the spacer 28 includes: a body section 28*a* engaged with the inner face side of the inner wall section 17*a* of the outer housing 17, the shape of which is substantially cylindrical; a flange section 28*b* engaged with the outer face side of the inner wall section 17*a* of the outer housing 17, the shape of which is substantially cylindrical, which is integrally formed so that it is bent backward from the front end portion of the body section 28*a;* and a bottom wall section 28*c* of the body section 28*a,* wherein the spacer 28 is formed into a box-shape, the front side of which is open.

The box section 12*a* of the inner housing 12 is engaged inside the body section 28*a* of the spacer 28. On the inner faces of the upper and the lower wall of the body section 28*a* of the spacer 28, there are respectively provided rib-shaped protrusions 29 for preventing the terminal from coming off by engaging with the rear end edge of the box section 12*a* of the housing 12 and also by engaging with the rear end edge of the box section 14*a* of the female terminal 14 accommodated in each terminal accommodating chamber 13.

Cutout sections 30, 31 are formed respectively at the positions on the front side of the connecting section of the body section 28*a* and the flange section 28*b* of the spacer 28 to where the engaging claws 15 and the flange section of the inner housing 12 are opposed. Engaging claws 32, which are integrally protruded, engaged with the engaging holes 23 of the outer housing 17 are provided on the outer face side of the upper and the lower wall of the body section 28*a* of the spacer 28 between the cutout sections 30, 30 on the upper and the lower side. Further, the forward end section of the flange section 28*b* of the spacer 28 holds the packing 24 engaged with the packing receiving section 25 of the inner wall section 17*a* of the outer housing 17.

Electrical wire insertion holes 33 are respectively formed at the positions in the bottom wall section 28*c* of the spacer 28 which are opposed to the electrical wire insertion holes 21 of the outer housing 17. The bottom wall section 28*c* of the spacer 28 holds the rubber plugs 18 inserted into the rubber plug accommodating recesses 19 of the bottom wall section 17*c* of the outer housing 17 when the engagement with the outer housing 17 has been completed. As shown in FIG. 6, each electrical wire 20 penetrating each electrical wire insertion hole 21 of the outer housing 17, each rubber plug 18 and each electrical wire insertion hole 33 of the spacer 28 is connected with pressure between a pair of pressure-contact blades 14*b*, 14*b* of each male terminal 14 accommodated in each terminal accommodating chamber 13 of the inner housing 12. Therefore, each terminal accommodating chamber 13 and each electrical wire 20 are sealed by each rubber plug 18 and packing 24.

In the case of assembling the above waterproof connector 10, as shown in FIG. 8(*a*), first, the rubber plug 18 is inserted in the connector housing engaging direction into each rubber plug accommodating recess section 19 inside the bottom wall section 17*c* of the outer housing 17. At the same time, the packing 24 is inserted into the packing receiving section 25 of the inner wall section 17*a* of the outer housing 17.

After that, as shown in FIG. 8(*b*), the body section 28*a* of the spacer 28 is inserted into the inner wall section 17*a* of the outer housing 17, and each engaging claw 32 of the body section 28*a* of the spacer 28 is engaged with each engaging hole 23 of the inner wall section 17*a* of the outer housing 17. When each engaging hole 23 of the inner wall section 17*a* of the outer housing 17 is engaged with each engaging claw 32 of the body section 28*a* of the spacer 28, each rubber plug 18 is prevented from coming off by the bottom wall section 17*c* of the outer housing 17, and at the same time the packing 24 is prevented from coming off by an inclined end portion of the flange section 28*b* of the spacer 28. Therefore, the waterproof property of the entire connector housing-can be more enhanced.

Next, as shown in FIG. 8(*c*), the electrical wire 20 is penetrated through each rubber plug 18 and each electrical wire insertion hole 33 of the bottom wall section 28*c* of the spacer 28 from each electrical wire insertion hole 21 of the bottom wall section 17*c* of the outer housing 17. Next, as shown in FIG. 8(*d*), each electrical wire 20 is connected with pressure to a pair of pressure-contact blades 14*b*, 14*b* of the female terminal 14 accommodated in each terminal accommodating chamber 13 of the inner housing 12 composing the inside of the connector housing 11.

Next, as shown in FIG. 8(*e*), the inner housing 12 is inserted into the body section 28*a* of the spacer 28, and each engaging claw 15 of the box section 12*a* of the inner housing 12 is engaged with the each engaging hole 23 of the inside wall section 17*a* of the outer housing 17. In this way, assembling of the waterproof connector 10 is completed. In this case, the rear edge end of the box section 12*a* of the inner housing 12 and the rear edge end of the box section 14*a* of the female terminal 14 accommodated in each terminal accommodating chamber 13 are respectively locked by the protrusions 29 protruding onto the inner faces of the upper and the lower wall of the body section 28*a* of the spacer 28, and further the protrusions 29 are not deformed outside. Accordingly, the female terminal 14 can be positively prevented from coming off from each terminal accommodating chamber 13. Further, both the female terminal 14 and the rubber plug 18 can be simultaneously held by the spacer 28. Therefore, it is unnecessary to provide exclusive parts used for preventing the rubber plug from coming off. Accordingly, the number of parts can be reduced and the manufacturing cost can be decreased. Further, the spacer 28 is locked double by the engagement of each engaging claw 32 of the spacer 28 with engaging hole 23 of the outer housing 17 and also by the engagement of each engaging claw 15 of the inner housing 12 with each engaging hole 23 of the outer housing 17. Therefore, each rubber plug 18 and packing 24 can be positively prevented from coming off. Accordingly, reliability of the waterproof connector can be more enhanced.

Second Embodiment

Second embodiment improves the efficiency of the waterproof connector 10 of the first embodiment.

Figure 1B:
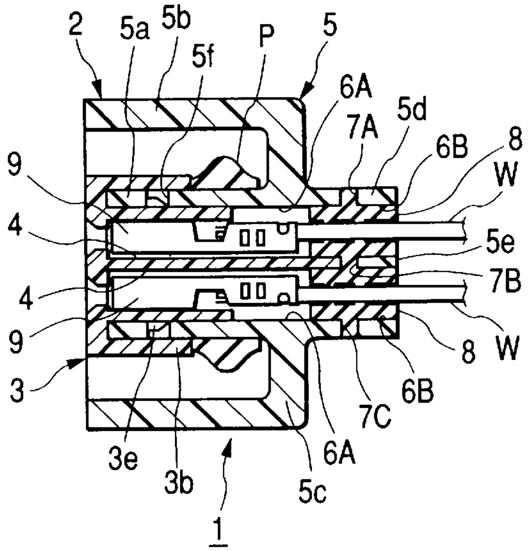
Figure 2:
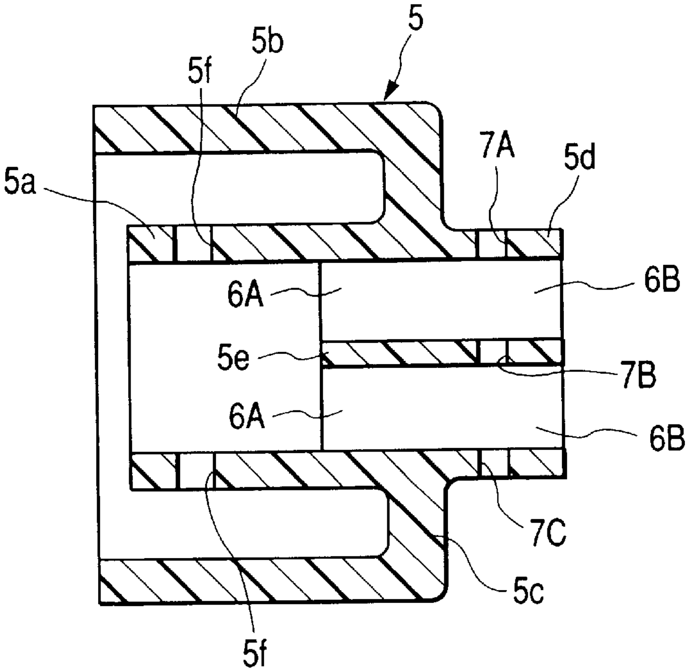
FIG. 2 is a cross-sectional view showing an outer housing used for the waterproof connector.
Figure 3:
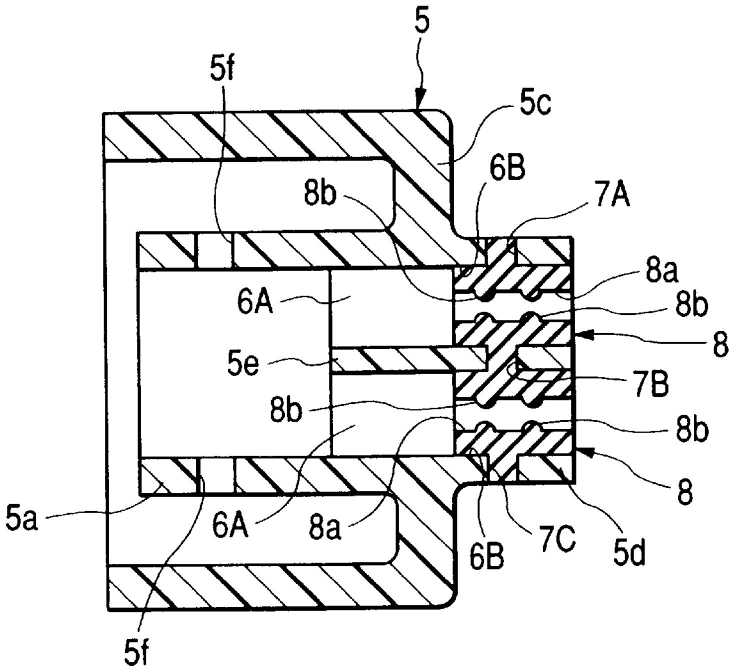
FIG. 3 is a cross-sectional view showing a state in which a rubber plug is molded integrally with the outer housing.
Figure 4:
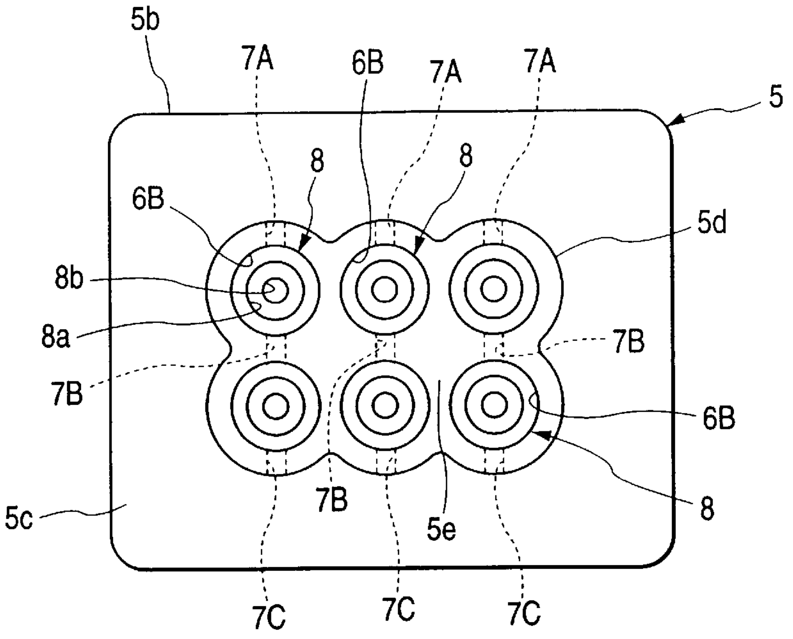
FIG. 4 is a rear view showing an outer housing with which the rubber plug is integrally molded.
Figure 5A:
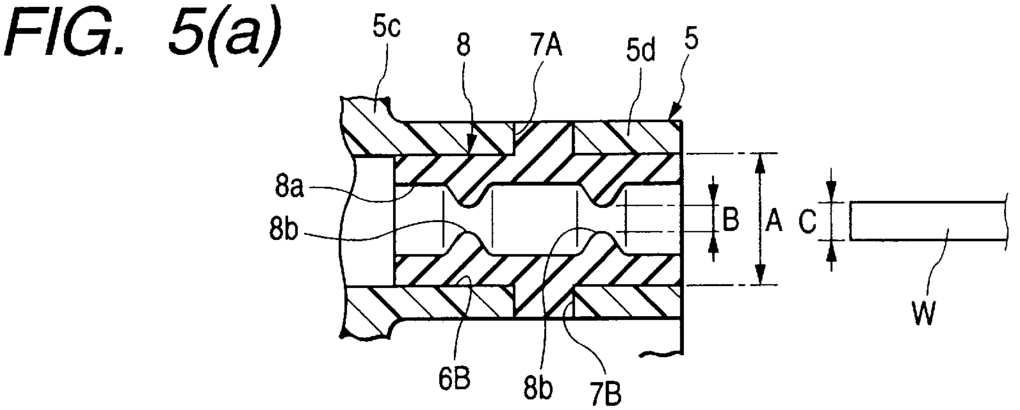
FIG. 5(*a*) is a partially cross-sectional view of a primary portion of an outer housing with which the rubber plug is integrally formed.
Figure 5B:
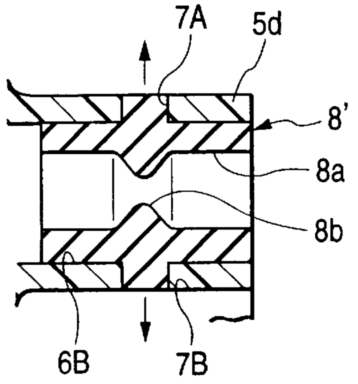

FIG. 1(*a*) is a cross-sectional view showing a state of a waterproof connector of an second embodiment of the present invention before it is assembled. FIG. 1(*b*) is a cross-sectional view showing a state of the. waterproof connector after it has been assembled. FIG. 2 is a cross-sectional view of an outer housing used for the waterproof connector. FIG. 3 is a cross-sectional view showing a state in which a rubber plug is integrally formed in the outer housing. FIG. 4 is a rear view of the outer housing in which the rubber plug is integrally formed. FIG. 5(*a*) is a partially cross-sectional view of a primary portion of an outer housing with which the rubber plug is integrally formed. FIG. 5(*b*) is a partially cross-sectional view of a comparative example of the primary portion.

As shown in FIGS. 1(*a*), 1(*b*) and 4, the connector housing 2 of the waterproof connector 1 includes: an inner housing 3 made of synthetic resin in which a plurality of terminal accommodating chambers 4 are integrally formed in the vertical and the horizontal direction (two stages of the terminal accommodating chambers 4 are formed in the vertical direction and three stages of the terminal accommodating chambers 4 are formed in the horizontal direction); and an outer housing 5 made of synthetic resin into which the inner housing 3 is inserted.

This inner housing 3 includes: a box section 3*a*, the upper and the lower face on the rear side of which are open, which is engaged with the inner face of the inner wall of the outer housing 5; and a flange section 3*b*, the shape of which is substantially cylindrical, which is integrally formed in such a manner that it is bent backward from the front end of the box section 3*a* and which is engaged with the outer face of the inner wall section 5*a* of the outer housing 5. Each terminal accommodating chamber 4 is formed in a space formed by the central horizontal wall 3*c* of the box section 3*a* and each vertical side wall 3*d* also used as a partition wall. Each terminal accommodating chamber 4 accommodates the female terminal (terminal) 9 with which electrical wire W is connected.

Engaging claws (engaging section) 3*e* to be engaged with the engaging holes 5*f* of the outer housing 5 are provided at the centers on both sides of the box section 3*a* of the inner housing 3. These engaging claws 3*e* are integrally protruded from both sides of the box section 3*a*. The front end portion of the flange section 3*b* of the inner housing 3 holds packing P which is inserted onto the outer face side of the inner wall section 5*a* of the outer housing 5 when engagement of the inner housing 3 with the outer housing 5 is completed. In this connection, a rectangular insertion hole 3*f*, into which the male terminal of the opponent connector not shown, is inserted is formed at a position opposed to each terminal accommodating chamber 4 on the front wall of the box section 3*a*. A pair of pressure-contact blades 9*b*, 9*b* with which electrical wire W is connected with pressure are provided in both side plate sections at the rear of the box section 9*a* of the female terminal 9. These pair of pressure-contact blades 9*b*, 9*b* are formed by bending.

The outer housing 5 includes: an inner wall section 5*a*, the shape of which is substantially square cylindrical; an external wall section 5*b*, the shape of which is substantially square cylindrical, which encloses this inner wall section 5*a*; and a bottom wall section (one wall section) 5*c* which connects the inner wall section 5*a* with the outer wall section 5*b*. Therefore the outer housing 5 is formed into a double box, the front side of which is open. A peripheral wall 5*d* which protrudes outside in such a manner that the peripheral wall 5*d* continues to the inner wall section 5*a* is provided at the center of this bottom wall section 5*c*. A terminal accommodating chamber 6A, the cross-section of which is circular via the partition wall 5*e*, is provided at a position corresponding to each terminal accommodating chamber 4 on the front side of this peripheral wall 5*d*. On the rear side of the peripheral wall 5*d*, there is provided a rubber plug accommodating chamber 6B, the cross-section of which is circular, communicating with each terminal accommodating chamber 6A via the partition wall 5*e*.

As shown in FIGS. 2 to 4, in the rows in the vertical direction of the peripheral wall 5*d* and the partition wall 5*e* forming the rubber plug accommodating chamber 6B of the outer housing 5, there are provided a plug material injection port 7A, plug material path 7B and vent hole 7C which are serially arranged in this order from the upper to the lower portion. In this case, the rows in the vertical direction of the peripheral wall 5*d* and the partition wall 5*e* are three vertical rows including the left, central and right rows. Molten rubber material (plug material) not shown is injected into each rubber plug accommodating chamber 6B in each row from the plug material injection port 7A of each row. In this way, the rubber plug 8 is integrally formed on the outer circumference of electrical wire W being closely contacted with electrical wire W. The sealing portion 8*b*, which is protruded, the cross-section of which is formed into a reverse U-shape, is integrally formed into an annular shape in the electrical wire insertion hole 8*a* of each rubber plug 8. That is, in the case where the rubber plug 8 is integrally formed in each rubber plug accommodating chamber 6 in each row of the outer housing 5, first, the outer housing 5 is formed into the shape shown in FIG. 2 by means of molding. After that, a rubber forming mold not shown is arranged in the inner-wall section 5*a*, outer-wall section 5*b*, peripheral wall 5*d* and partition wall 5*e* of the outer housing 5, and molten rubber material is made to flow into the cavity of the rubber forming mold from the plug material injection port of each row. In this way, the rubber plug 8 is integrally formed in each rubber plug accommodating chamber 6B of each row of the outer housing 5.

As shown in FIG. 5(*a*), the following inequality is satisfied, $$A-B>C,$$

where A is an inner diameter of each rubber plug accommodating chamber 6B of the outer housing, B is an inner diameter of each sealing portion 8*b* in the electrical wire insertion hole 8*a* of each rubber plug 8, and C is an outer diameter of electrical wire W. Further, the positions of a pair of sealing portions 8*b*, 8*b* in the electrical wire insertion hole 8*a* of the rubber plug 8 integrally formed in each rubber plug accommodating chamber 6B in each row are arranged so that they can not be the same as the positions of the plug material injection port 7A, plug material path 7B and vent hole 7C of each row. That is, the pair of sealing portions 8*b*, 8*b* of the rubber plug 8 are located at positions distant from the plug material injection hole 7A and others by the substantially same distance.

Rectangular engaging holes (engaging sections) 5*f* which are attached to and detached from the engaging claws 3*e* arranged on both sides of the box section 3*a* of the inner housing 3 are provided on both sides of the front of the inner wall section 5*a* of the outer housing 5. Further, an annular waterproof packing P made of rubber is inserted into the inner portion on the outer face side of the inner wall section 5*a* of the outer housing 5.

The waterproof connector 1 of the above embodiment is assembled as follows. Packing P is previously inserted into the inner part on the outer face side of the inner wall section 5*a* of the outer housing 5 which forms the outside of the connector housing 2. Next, as shown in FIG. 1(*a*), electrical wire W is penetrated from the outside into the electrical wire insertion hole 8*a* of the rubber plug 8 integrally formed in each rubber plug accommodating chamber 6B of the outer housing 5. Next, electrical wires W are connected with pressure with a pair of pressure-contact blades 9*b*, 9*b* of each female terminal 9 accommodated in the plurality of terminal accommodating chambers 4 of the inner housing 3 composing the inside of the connector housing 2.

Next, electrical wire W is drawn in the direction of the outside of the outer housing 5. While electrical wire W is being slid with respect to the electrical wire insertion hole 8*a* of the rubber plug 8 integrally formed in each rubber plug accommodating chamber 6B of the outer housing 5, the inner housing 3 is engaged with the inner wall section 5*a* of the outer housing 5 as shown in FIG. 1(*b*). Due to the above engagement, each engaging claw 3*e* of the box section 3*a* of the inner housing is engaged with each engaging hole 5*f* of the inner wall section 5*a* of outer housing 5. In this way, assembling the waterproof connector 1 is completed. When this assembling work is completed, the pressure-contact blade 9*b* of each female terminal 9 is accommodated in each terminal accommodating chamber 6A of the outer housing 5.

As described above, the rubber plug 8 tightly coming into contact with the outer circumference of electrical wire W is formed in each rubber plug accommodating chamber 6B when plug material is injected from each plug material injection port 7A of each row in the vertical direction of the outer housing 5. Therefore, the cycle time of integrally forming rubber material is shortened, that is, the molding time can be reduced. Each rubber plug accommodating chamber 6B is made to adhere to each rubber plug 8 by primer. Therefore, it is possible to provide a perfect waterproof performance. Further, the rubber plug 8 having a pair of sealing portions 8*b*, 8*b* tightly coming into contact with the outer circumference of electrical wire W is integrally formed in each rubber plug accommodating chamber 6B of the outer housing 5. Therefore, there is no possibility that a worker forgets to attach the rubber plug 8, and sealing can be easily and positively made between the rubber plug 8 and electrical wire W. Therefore, the waterproof performance and the waterproof reliability can be more enhanced. Due to the foregoing, it becomes unnecessary to provide a process in which the rubber plug 8 is attached to each rubber plug accommodating chamber 6B of the outer housing 5 when the waterproof connector 1 is assembled. Therefore, the multipolar waterproof connector 1, the sealing property of which is high, can be simply assembled in a short period of time. Accordingly, the entire assembling property can be more enhanced.

As shown in FIG. 5(*a*), the positions of a pair of sealing portions 8*b*, 8*b* in the electrical wire insertion hole 8*a* of the rubber plug 8 integrally formed in each rubber plug accommodating chamber 6B in each row of the outer housing 5 are made to be different from the positions of the plug material injection port 7A and others in each row. Therefore, it is possible to positively prevent the deterioration of the waterproof performance of electrical wire W with respect to the pair of sealing portions 8*b*, 8*b* in the electrical wire insertion hole 8*a* of each rubber plug 8. That is, as shown in FIG. 5(*b*), in the case where the position of the sealing portion 8*b* in the electrical wire insertion hole 8*a* of the rubber plug 8' integrally formed in each rubber plug accommodating chamber 6B in each row is made to coincide with the position of the plug material injection port 7A in each row, when electrical wire W is inserted into the electrical wire insertion hole 8*a* of the rubber plug 8', the rubber plug 8' is elastically deformed via the sealing portion 8*b* from the plug material injection port 7A in the direction of an arrow shown in FIG. 5(*b*). Therefore, resiliency of the sealing portion 8*b* is lowered, and the sealing property is deteriorated. However, in this embodiment, there is no possibility that the above phenomenon occurs. Accordingly, the waterproof performance and the waterproof reliability of the waterproof connector 1 can be more enhanced.

In the above embodiment, the electrical wire is connected to the crimp-style terminal by crimping. However, it should be noted that the present embodiment is not limited to the crimp-style terminal. Of course, the present embodiment can be applied to a case in which the electrical wire is connected to the pressure-connected terminal by pressure. Further, the rubber plug is not necessarily made of pure rubber. As long as it is an elastic material such as soft resin, it is possible to use the material for the rubber plug.

As explained above, according to the invention, plug material is injected from the plug material injection port in each row of the connector housing into each rubber plug accommodating chamber in each row, so that the rubber plug can be integrally formed in which the electrical wire insertion hole having a plurality of sealing portions tightly coming into contact with the outer circumference of the electrical wire is formed. Therefore, no workers forget to attach the rubber plugs, and sealing can be positively made between each rubber plug accommodating chamber of the connector housing and the rubber plug and also between the rubber plug and the electrical wire. Therefore, the waterproof performance and the waterproof reliability can be enhanced. Due to the foregoing, it becomes unnecessary to provide a process in which the rubber plug is attached to the connector housing when the waterproof connector is assembled. Therefore, the multipolar waterproof connector, the sealing property of which is high, can be assembled in a short period of time, and the entire assembling property can be more enhanced.

The present invention provides a waterproof connector, in which the positions of the plurality of sealing portions arranged in the electrical wire insertion holes of the rubber plugs integrally formed in the rubber plug accommodating chambers in each row are arranged so that they can not be the same as the positions of the plug material injection ports, plug material paths and vent holes in each row. Therefore, it is possible to prevent the deterioration of the waterproof performance with respect to a plurality of sealing portions in the electrical wire insertion holes of the rubber plug. Accordingly, the waterproof performance and the waterproof reliability of the waterproof connector can be more enhanced.

What is claimed is:

1. A method of providing waterproof characteristic to a waterproof connector made of resin material, said connector including: a connector housing; a terminal accommodating chamber provided in said connector housing; and a rubber plug accommodating chamber provided in said connector housing and communicated with said terminal accommodating chamber, said method comprising the steps of:

providing a port communicated with an interior of said rubber plug accommodating chamber;

setting a rubber forming mold in said rubber plug accommodating chamber;

injecting molten rubber material from said port to a space defined by said rubber plug accommodating chamber and said rubber forming mold to mold a rubber plug, wherein a sealing portion is projected from an inside surface of said rubber plug for close contact with an outer circumference of a wire, in said rubber plug accommodating chamber; and removing said rubber forming mold from said rubber plug accommodating chamber.

2. A method of providing waterproof characteristic to a waterproof connector according to claim 1, wherein said step of providing includes providing said port to each of a plurality of said rubber accommodating chambers, said step of setting includes setting said rubber forming mold into each of said plurality of said rubber accommodating chambers, said step of injecting includes injecting said molten rubber material from each said ports to each said spaces, said step of removing includes removing each said rubber forming molds from each said rubber plug accommodating chambers.

* * * * *